No. 701,257.  
J. H. COPE.  
HAY STACKER.  
(Application filed Aug. 12, 1901.)  
(No Model.)
Patented May 27, 1902.
2 Sheets—Sheet 1.
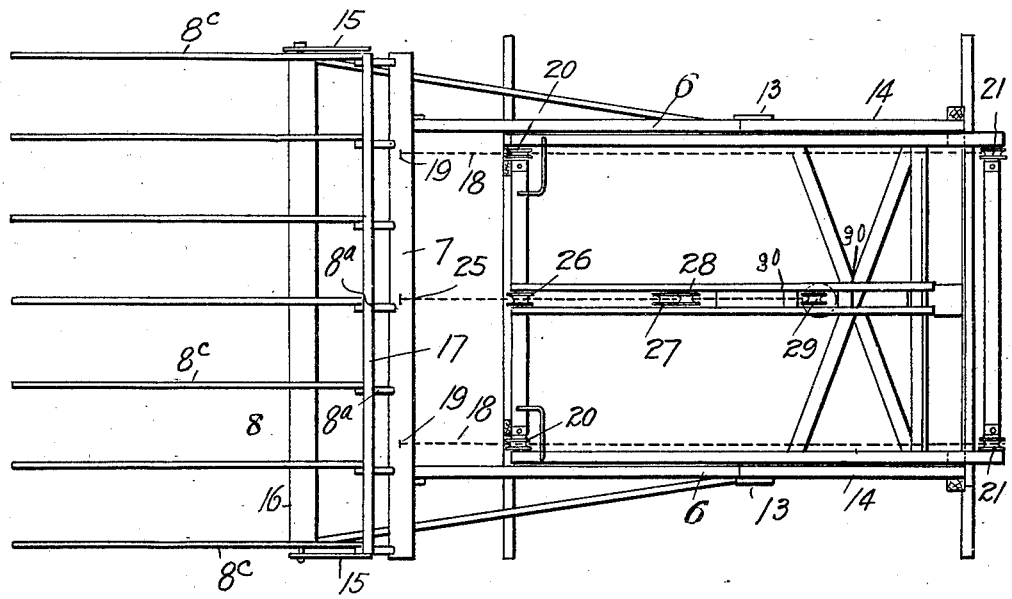
Fig. 2
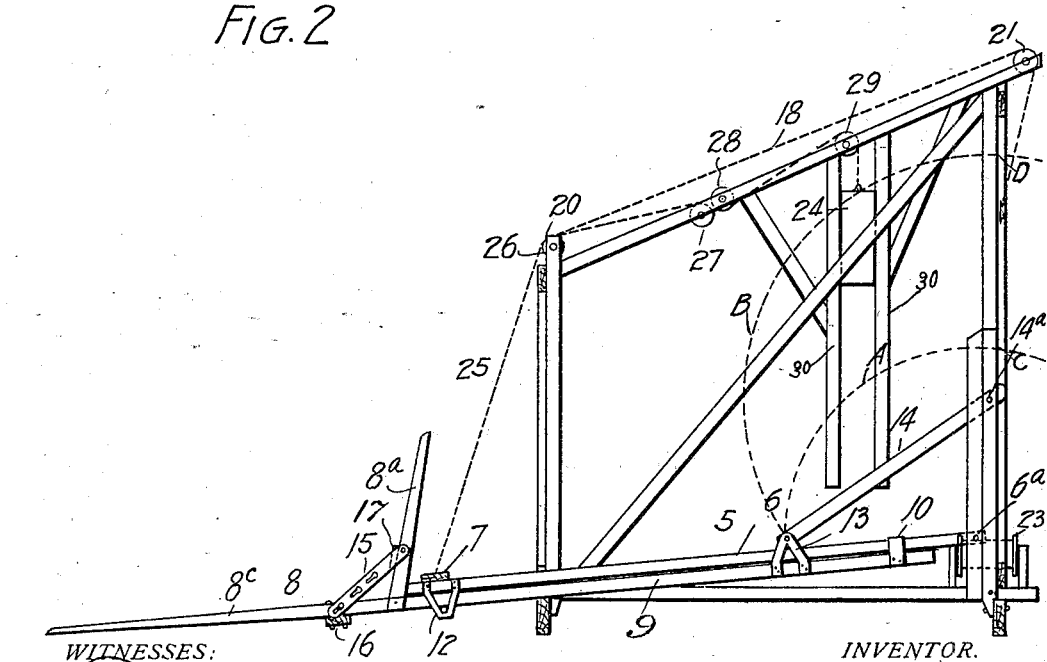
WITNESSES:
Fig. 1
INVENTOR.
J. H. Cope.
BY 
ATTORNEY
THE NORRIS PETERS CO., PHOTO-LITHO., WASHINGTON, D. C.

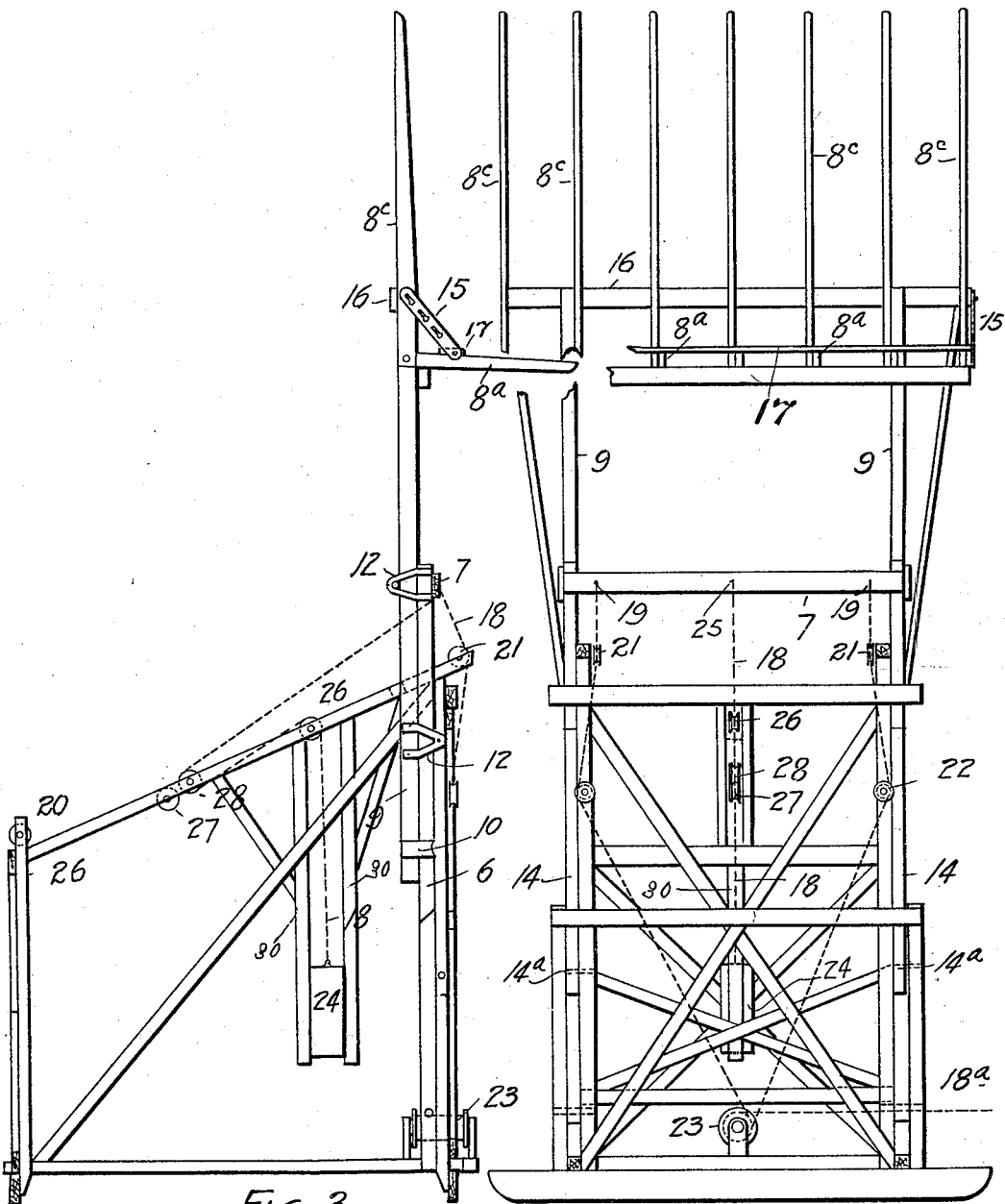

UNITED STATES PATENT OFFICE.

JOSEPH H. COPE, OF WINDSOR, COLORADO.

HAY-STACKER.

SPECIFICATION forming part of Letters Patent No. 701,257, dated May 27, 1902.

Application filed August 12, 1901. Serial No. 71,694. (No model.)

*To all whom it may concern:*

Be it known that I, JOSEPH H. COPE, a citizen of the United States of America, residing at Windsor, in the county of Weld and State of Colorado, have invented certain new and useful Improvements in Hay-Stackers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.
My invention relates to improvements in hay-stackers, my object being to provide an apparatus of this class having an extensible head arranged to be projected outwardly from the frame as it is lifted, thus making it practicable to leave the head close to the frame when on the ground or in its lowest position and at the same time raise the hay to any desired height as the head is lifted.

My further object is to provide an apparatus of this class which shall be comparatively simple in construction, economical in cost, reliable, durable, and efficient in use; and to these ends the invention consists of the features, arrangements, and combinations hereinafter described and claimed, all of which will be fully understood by reference to the accompanying drawings, in which is illustrated an embodiment thereof.

In the drawings, Figure 1 is a side elevation of my improved hay-stacker, the head being shown in the lowermost position. Fig. 2 is a top or plan view of the stacker. Fig. 3 is a side elevation showing the head in the raised and extended position. Fig. 4 is a rear view of the same.

The same reference characters indicate the same parts in all the views.

Let the numeral 5 designate the framework of the stacker, which framework may be of any suitable construction. Upon the rear portion of this frame, near the bottom, is pivotally connected, as shown at $6^a$, a lifting-frame composed of two bars 6, whose forward extremities are connected by a cross-bar 7.
The head 8 of the stacker is secured to two arms 9, which are slidably connected with the bars 6 of the lifting-frame in any suitable manner. As shown in the drawings, a metal strap or guide-casting 10 is secured to each arm 9 and passes around the adjacent bar of the lifting-frame. Near the forward extremity of each bar 6 is also secured a guide-bracket 12, which passes around the adjacent arm 9 of the stacker-head. The arms 9 slide freely in these brackets. Another similar guide-bracket 13 is made fast to each arm 9 and projects on opposite sides of the adjacent bars 6 of the lifting-frame. Each of these last-named brackets 13 is pivotally connected with one extremity of a bar 14, whose opposite extremity is pivoted on the frame at a point $14^a$ above the pivotal points $6^a$ of the bars 6 of the lifting-frame. The fingers $8^a$ of the stacker-head, which project at an angle to the main teeth $8^c$, are adjustably connected with the teeth $8^c$ by means of two links 15, provided with a number of openings, through which fastening devices connected with the outer teeth $8^c$ may pass. The fingers $8^a$ are pivotally connected with the teeth $8^c$. Hence by the use of the links 15 the fingers may be made to form any desired angle with the teeth. The fingers are connected together by a cross-bar 17.

The hoisting ropes or cables 18 are connected at suitable points 19 with the cross-bar 7 of the lifting-frame. From these points 19 the cables pass over pulleys 20, mounted on the upper forward part of the frame, thence over pulleys 21, mounted on the upper rear part of the frame, thence downwardly, engaging guide-pulleys 22, and finally downwardly around the drum 23, which is so arranged that the pull on the cable for hoisting purposes may be outwardly from the stacker-frame in either direction, as indicated by the line $18^a$ in Fig. 4.

A suitable counterbalance-weight 24 is connected with the bar 7 of the lifting-frame by means of a suitable rope or cable 25, which is connected with the central part of the cross-bar 7, passes thence over a pulley 26, thence between two pulleys 27 and 28, and finally over a pulley 29, mounted on the upper part of the frame.

From the foregoing description the use and operation of my hay-stacker will be readily understood. Assuming that the stacker-head is in the lowermost position, or that shown in Figs. 1 and 2, the hay is carried to the teeth of the head by means of a sweep-rake. (Not shown.) The stacker-frame is located in suitable proximity to the stack. A team of horses hitched to the extremities 18ª of the cable is driven from the stacker-frame in either direction. This pull on the cables raises the lifting-frame and the rake-head connected therewith. As the stacker-head moves upwardly it is projected outwardly from the frame by reason of the connection between the bars 14 and the arms 9 and the slidable relation between the arms 9 and the bars 6 of the lifting-frame. The degree of the stacker-head's extension or outward movement is the distance between the arcs A and B at the points C and D. Hence by reason of my construction the stacker-head is raised to the same height as it would be if it were of ordinary construction and the head were further removed from the frame to the extent of the distance between the points C and D. It is evident that the nearer the stacker-head is to the frame when in its lowest position the greater the advantage in applying the lifting power through the instrumentality of the cables 18, since the initial lifting force is applied more nearly in a vertical plane or in a plane at right angles to the longitudinal direction of the head and its arms 9. The counterbalance-weight is slidable in guides 30, mounted on the frame, whereby the weight is retained in position and prevented from swinging about during the operation of the stacker.

Having thus described my invention, what I claim is—

1. In a hay-stacker, the combination with a suitable relatively stationary framework, of a lifting-frame hinged or pivoted thereon, a stacker-head slidably connected with said lifting-frame, and a link connection between the rigid part of the stacker-head and the frame, the point of connection with the frame being above the plane of the stacker-head when the latter is in its lowermost position, whereby the latter is projected outwardly from the stationary frame as the lifting-frame is raised.

2. In a stacker, the combination with a relatively stationary frame, of a lifting-frame pivoted on the stationary frame, a stacker-head slidably connected with the pivoted frame, and a link connecting a rigid part of the head with the stationary frame, the point of the framework where the link is connected being above the pivoted point of the lifting-frame, whereby as the lifting-frame is raised the head is extended or moved outwardly thereon.

3. In a stacker, the combination with a relatively stationary frame, of a lifting-frame hinged or pivoted thereon, a head having bars rigidly connected therewith and slidably connected with the pivoted frame, and links connected with the rigid head-bars at one extremity and with the stationary frame at the opposite extremity at a point above the pivoted point of the lifting-frame.

4. In a stacker, the combination with a relatively stationary frame, of a lifting-frame hinged or pivoted on the stationary frame, suitable hoisting devices mounted on the stationary frame and connected with the lifting-frame, in suitable operative relation, a stacker-head slidably connected with the lifting-frame, and links connected with a rigid part of the stacker-head at one extremity and with the stationary frame at the opposite extremity at points above the lifting-frame pivot, for extending the stacker-head or moving it outwardly on the lifting-frame.

5. In a stacker, the combination with a relatively stationary frame, of a lifting-frame hinged or pivoted thereon, hoisting means connected with the lifting-frame, a counterweight also connected with the lifting-frame and suspended on the stationary frame, a stacker-head slidably connected with the lifting-frame, and links pivoted on the stationary frame above the lifting-frame pivot, and connected with a rigid part of the stacker-head for extending the said head on the lifting-frame as the head is raised with the last-named frame.

6. The combination with a suitable stationary frame, of a lifting-frame pivotally connected with the stationary frame and having two parallel bars, a stacker-head provided with two bars rigidly connected with the head proper and slidably connected with the parallel bars of the lifting-frame, and links or arms connected with the rigid bars of the head at one extremity and with the stationary frame at the opposite extremity, at points above the pivoted points of the lifting-frame.

7. In a stacker, the combination with a relatively stationary frame, of a lifting-frame pivoted on the stationary frame, a stacker-head having bars rigidly connected therewith, guides secured to the bars of the stacker-head and passing around the adjacent bars of the lifting-frame forming a sliding connection between the two sets of bars, and links connected with said guides at one extremity and with the stationary frame at the opposite extremity at points above the pivot of the lifting-frame.

In testimony whereof I affix my signature in presence of two witnesses.

JOSEPH H. COPE.

Witnesses:
T. F. VINCENT,
F. E. BONIFIELD.